United States Patent

Pardoen et al.

Patent Number: 6,077,929
Date of Patent: Jun. 20, 2000

[54] INTERNALLY BLOCKED POLYAMINE CROSSLINKERS AND COATING COMPOSITIONS CONTAINING THE SAME

[75] Inventors: Johannes Adrianus Pardoen, Halsteren; Wincenty Lambertus Stanislaw Pilaszek, Tholen; Jan Wilhelm Ernst Moos; Keimpe Jan Van Den Berg, both of Sassenheim, all of Netherlands

[73] Assignee: Akzo Nobel N.V., Arnheim, Netherlands

[21] Appl. No.: 09/056,445

[22] Filed: Apr. 7, 1998

Related U.S. Application Data

[63] Continuation of application No. PCT/EP96/04379, Oct. 9, 1996.

[51] Int. Cl.$^7$ .............................. C08L 33/00; C08F 8/32; C08F 20/00; C08F 59/40

[52] U.S. Cl. .................... 528/220; 528/100; 528/110; 528/111; 528/113; 528/119; 528/120; 528/123; 528/229; 528/310; 528/328; 525/523; 525/526; 525/528; 525/529; 525/530; 525/531; 525/532; 525/533

[58] Field of Search ...................... 528/220, 229, 528/310, 328, 100, 110, 111, 113, 119, 120, 123; 525/523, 526, 528, 529, 530, 531–533

[56] References Cited

U.S. PATENT DOCUMENTS

| | | |
|---|---|---|
| 3,293,243 | 12/1966 | Sulkowski . |
| 3,535,342 | 10/1970 | Emmons . |
| 3,625,958 | 12/1971 | Cantatore et al. . |
| 3,657,192 | 4/1972 | Schulz et al. . |
| 4,835,289 | 5/1989 | Brindöpke . |
| 4,892,954 | 1/1990 | Brindöpke et al. . |
| 5,332,785 | 7/1994 | Brindoepke ............................. 528/110 |
| 5,378,762 | 1/1995 | Czorniji et al. ......................... 525/123 |

FOREIGN PATENT DOCUMENTS

| | | |
|---|---|---|
| 0119840 | 9/1984 | European Pat. Off. . |
| 0284953 | 10/1988 | European Pat. Off. . |
| 0319864 | 6/1989 | European Pat. Off. . |
| 0365098 | 4/1990 | European Pat. Off. . |
| 0378265 | 7/1990 | European Pat. Off. . |
| 0483915 | 5/1992 | European Pat. Off. . |
| 1485925 | 9/1977 | United Kingdom . |
| 94/15974 | 7/1994 | WIPO . |
| WO97/13795 | 4/1997 | WIPO . |

OTHER PUBLICATIONS

Kasprzyk et al., "Synthesis and Conformational Analysis of C–Alkyl Derivatives of 2,3,6,7–Tetrahydro–1H–1,4–Diazepine", *Polish Journal of Chemistry*, (1984), vol. 58, pp. 721–735.

Hua et al., "Selective Nucleophilic Addition Reactions of Alkyllithium Reagents with N–(Trimethylsilyl)lactams. Synthesis of Cyclic Ketimines", *J. Org. Chem.*, (1990), vol. 55, pp. 3682–3684.

Ried et al., "Über heterocyclische Siebenringsysteme, III. Mitteil.: Synthesen einfacher 7–gliedriger Heterocyclen mit 2 Stickstoff–Atomen", *Chemische Berichte*, (1954), vol. 87, pp. 1811–1814.

Hofmann et al., "Synthesis and Structure of 7–Methyl– and 7–Phenyl–1,2,3,4–tetrahydro–1,4–diazepin–5–ones", *Tetrahydrodiazepinones*, (1962), vol. 27, pp. 3565–3568.

*Primary Examiner*—P. Hampton-Hightower
*Attorney, Agent, or Firm*—Dilworth & Barrese

[57] ABSTRACT

The present invention pertains to coating compositions including a particular class of internally blocked polyamines as replacement for traditional blocked and unblocked polyamine crosslinkers. The use of these internally blocked polyamines results in better appearance characteristics and a lower VOC than are generally available with the traditional blocked varieties.

10 Claims, No Drawings

6,077,929

INTERNALLY BLOCKED POLYAMINE CROSSLINKERS AND COATING COMPOSITIONS CONTAINING THE SAME

This application is a continuation of PCT/EP96/04379 filed Oct. 9, 1996.

FIELD OF THE INVENTION

The present invention relates generally to internally blocked polyamines (e.g., cyclic ketimines or cyclic aldimines) and their use as partial or complete replacements for traditional amine crosslinkers, particularly in the coatings field.

BACKGROUND OF THE INVENTION

Compositions based upon polyamine crosslinkers and compounds containing amine-reactive functionalities ("binders") are well-known in the literature. As examples of such amine-reactive functionalities in combination with polyamine crosslinkers may be mentioned:

(i) activated unsaturated groups such as (meth)acryloyl groups and other groups derived from maleic acid and anhydride, fumaric acid, and itaconic acid and anhydride;
(ii) activated methylene groups such as acetoacetate and malonate groups;
(iii) epoxy groups;
(iv) isocyanate groups;
(v) aromatic activated aldehyde groups;
(vi) cyclic carbonate groups and
(vii) acid, anhydride, and ester groups, including oxalate esters.

For examples of publications describing the above groups in more detail reference is made to WO 94/15974.

In general, the amino groups of the traditional polyamine crosslinkers are quite reactive with the above-mentioned functionalities under ambient or low (less than 120° C.) temperature conditions. This can result in a too short potlife and consequent application problems.

In many of the above systems, therefore, the highly reactive amino groups of the polyamine crosslinkers are blocked in order to allow the formulation of systems with an acceptable potlife. For primary amino groups, the common blocking agents are ketones and aldehydes, resulting in, respectively, ketimines and aldimines. The reaction sequence is as follows:

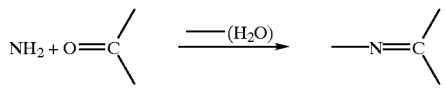

The resulting imine group is stable under anhydrous conditions, but relatively unstable even in the presence of atmospheric humidity. This property has been utilised quite successfully in low and ambient temperature cure applications. The use of these kinds of ketimines and aldimines, however, has certain disadvantages.

For example, the deblocking of the primary amino group results in the liberation of a volatile ketone or aldehyde. This liberated component not only adds to the overall VOC (Volatile Organic Content) of the system, but can also have detrimental consequences to the appearance characteristics of the resulting crosslinked products (e.g., clouding in clearcoat applications).

SUMMARY OF THE INVENTION

The present invention provides a suitable alternative which overcomes the above-mentioned disadvantages of the traditional polyamine and blocked amine crosslinkers. Accordingly, the present invention pertains to an internally blocked polyamine crosslinker of the following formula (I):

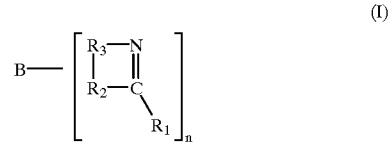

wherein
B is a monomeric or oligomeric backbone;
$R_1$ is hydrogen or a substituted or unsubstituted hydrocarbon group, optionally containing a functional group;
at least one of $R_2$ and $R_3$ is a substituted or unsubstituted alkylene group;
at most one of $R_2$ or $R_3$ is a group of the formula (II) or (III)

wherein
$R_4$ is a substituted or unsubstituted alkylene group, and the N atom is attached to both B and the other of $R_2$ or $R_3$,
$R_5$ is a substituted or unsubstituted alkylene group and $R_6$ is hydrogen or a substituted or unsubstituted alkyl group, while either $R_5$ or $R_6$ is attached to B;
$n \geq 2$; and
the ring defined by $R_3$, $R_2$, and N=C in formula (I) consists of 4–12 atoms.

$R_1$ is preferably a substituted or unsubstituted alkyl group, more preferably a $C_{1-10}$ alkyl group, most preferably a $C_{1-5}$ alkyl group, e.g. methyl, ethyl, propyl, and butyl. The functional groups may be preferably selected from ether and ester groups. An ester group is more preferred. Preferably, $R_2$, $R_3$, and $R_4$ are independently selected from a $C_{1-9}$ alkylene group, preferably a $C_{1-4}$ alkylene group. $R_5$ is a $C_{1-7}$ alkylene group, preferably a $C_{1-4}$ alkylene group. $R_6$ is preferably hydrogen or a $C_{1-4}$ alkyl group. The optional substituents of $R_1$, $R_2$, $R_3$, $R_4$, $R_5$, and $R_6$ are preferably alkyl groups, such as a $C_{1-4}$ alkyl group, more preferably methyl and ethyl. Preferably, n is 2. Also preferred is that the ring defined by $R_3$, $R_2$, and N=C in formula (I) consists of 6–12 atoms.

When formula III is selected for one of $R_2$ or $R_3$, B is attached to either $R_5$ or $R_6$. This link is made by reacting an electrophilic group on B with a nucleophilic moiety substituted on either $R_5$ or $R_6$ to produce the internally blocked polyamine crosslinker of the formula I. This nucleophilic moiety may be an amine or a hydroxy group. Accordingly, one of the substituents of $R_5$ or $R_6$ is a derivative of this nucleophilic moiety. At most one derivative of this nucleophilic moiety may be present in the internally blocked polyamine.

It is preferred that the internally blocked polyamine crosslinker of the formula I does not contain any reactive groups.

Non-limiting, more specific examples of the crosslinker of formula (I) include formulae (IA)-(IG) below:

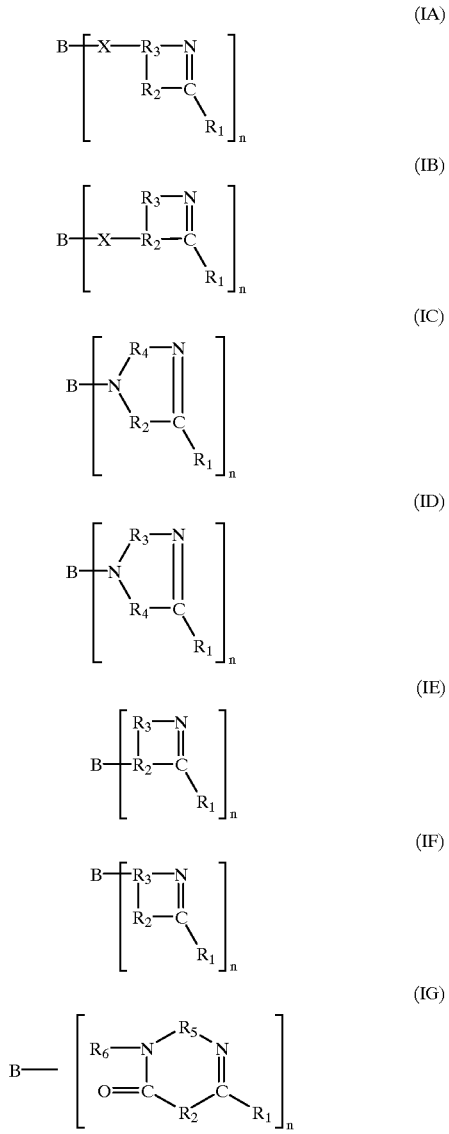

In formulae (IA) and (IB) X is the residue of the reaction product of a reactant providing the ring defined by $R_3$, $R_2$, and N=C, and an oligomer providing B.

These internally blocked polyamines find particular use as crosslinkers in coating compositions comprising compounds containing amine-reactive functionalities of the types mentioned above, preferably activated unsaturated groups, activated methylene groups, cyclic carbonate groups, epoxy groups and isocyanates. Most preferred are acryloyl group- and/or acetoacetate group-containing compounds. They are particularly useful in the formulation of solvent borne and waterborne coating systems, such as high solids coating systems, especially those which cure under ambient or low temperature conditions.

In these and other coatings applications, the internally blocked amines in accordance with the present invention allow formulation of coating systems having overall lower VOC and better appearance characteristics.

These and other features and advantages of the present invention will be more readily understood by those skilled in the art from the following detailed description.

DETAILED DESCRIPTION OF THE PREFERRED EMBODIMENTS

"Monomeric" in the present description is utilised in the sense of one monomer unit having two or more amine-reactive functionalities, such as, e.g., butane diol diglycidyl ether and 1,2-propylene diisocyanate.

"Oligomeric" in the present description is utilised in the well-known sense to refer to low to medium molecular weight compounds below macromolecular proportions, which is generally considered to be a molecular weight of 10,000 or less, consisting of two or more monomer units and two or more amine-reactive functionalities.

"Polyamine" as utilised in the present description refers to a compound containing at least two amino groups.

"VOC" refers to the volatile organic content of systems, which is normally expressed in numeric terms as grams of organic volatiles per liter of organic component (i.e., after removal of water and "exempt" solvents). For the purposes of the present specification, the VOC of a coating composition can be determined via the methodology described in ASTM test D2369-90.

Crosslinkers according to the present invention can be synthesised by reacting a monocyclic ketimine with a polyfunctional cyclic ketimine-reactive backbone. The cyclic ketimine group is unaffected during the coupling reaction. The coupling reaction can be achieved by the introduction of a reactive group on the cyclic ketimine ring (for instance a hydroxyl group or amine group) or by making use of other reaction properties of the ketimine functionality as such (alkylation on the α-carbon next to the C=N bond, i.e.—C—C=N—).

The synthesis of the monocyclic ketimine compounds is known in the literature, e.g., from U.S. Pat. No. 3,625,958 and U.S. Pat. No. 3,657,192.

In particular, three non-limiting procedures are especially suitable for the production of the desired internally blocked polyamine crosslinker comprising a monomeric or oligomeric backbone having pendant therefrom at least two groups each containing at least one internally blocked amine. These procedures are:

(I) Reacting 1) a compound comprising at least one internally blocked amino group and one secondary amino group which is part of the ring and 2) a substantially stoichiometric amount of a monomer or an oligomer comprising at least two amine-reactive groups (i.e., the monomeric or oligomeric backbone);

(II) Reacting, under moisture-free conditions, 1) a compound comprising at least one internally blocked amino group and 2) a substantially stoichiometric amount of a monomer or an oligomer comprising at least one, preferably at least two, Michael acceptor moieties;

(III) Reacting 1) a compound comprising at least one internally blocked amino group and one nucleophilic moiety pendant from the ring and 2) a substantially stoichiometric amount of a monomer or an oligomer comprising at least two nucleophilic-reactive (or electrophilic) moieties.

These three procedures yield compositions comprising a substantial amount of the desired internally blocked polyamines, thereby facilitating the use of these reaction products in the desired manner as crosslinkers for a variety of compounds containing amine-reactive functionalities.

As suitable monomers and oligomers containing at least two amine-reactive groups for use in method (I) can be mentioned monomers and oligomers containing amine-reactive functionalities of the types mentioned above and which result in a internally blocked polyamine meeting the general conditions detailed above. Specifically preferred examples of such monomers and oligomers are monomers and oligomers comprising at least difunctional epoxy groups, blocked and/or unblocked isocyanate groups, activated unsaturated groups, activated methylene groups, or cyclic carbonate groups.

As examples of suitable epoxy groups-containing monomers and oligomers may be mentioned the glycidyl ethers of (cyclo)aliphatic or aromatic hydroxyl compounds, such as ethylene diol, butane diol, glycerol, cyclohexane diol, 2,2-(bis-4-hydroxycyclohexyl)-propane, mononuclear di- or polyvalent polyols, bisphenols such as Bisphenol-A or Bisphenol-F, and polynuclear phenols; epoxidized and, optionally, hydrogenated divinyl benzene; polyglycidyl ethers of phenol formaldehyde novolak; epoxy compounds containing an isocyanurate group; an epoxidized polyalkadiene such as epoxidized polybutadiene; hydantoin epoxy resins; epoxy resins obtained by epoxidization of (cyclo) aliphatic alkenes such as dipentene dioxide, dicyclopentadiene dioxide, and vinylcyclohexane dioxide; and glycidyl group-containing resins such as polyesters, polyurethanes, polyepoxyesters, and polyacrylics.

As examples of suitable isocyanate groups-containing monomers and oligomers may be mentioned (cyclo) aliphatic or aromatic polyisocyanates such as 1,2-propylene diisocyanate, 1,3-propylene diisocyanate, 1,4-butylene diisocyanate, 2,3-butylene diisocyanate, hexamethylene diisocyanate, octamethylene diisocyanate, 2,2,4-trimethyl hexamethylene diisocyanate, 2,4,4-trimethyl hexamethylene diisocyanate, dodecamethylene diisocyanate, ω,ω-dipropyl ether diisocyanate, 1,3-cyclopentane diisocyanate, 1,2-cyclohexane diisocyanate, 1,4-cyclohexane diisocyanate, isophorone diisocyanate, 4-methyl-1,3-diisocyanatocyclohexane, trans-vinylidene diisocyanate, dicyclohexylmethane-4,4'-diisocyanate, 3,3'-dimethyldicyclohexylmethane-4,4'-diisocyanate, toluene diisocyanate, 1,3-bis(isocyanatomethyl)benzene, xylylene diisocyanate, 1,5-dimethyl-2,4-bis(isocyanatomethyl) benzene, 1,5-dimethyl-2,4-bis(2-isocyanatoethyl)benzene, 4,4'-diisocyanatodiphenyl, 3,3'-dichloro-4,4'-diisocyanatodiphenyl, 3,3'-diphenyl-4,4'-diisocyanatodiphenyl, 3,3'-dimethoxy-4,4'-diisocyanatodiphenyl methane, a diisocyanatonaphthalene; compounds such as 1,3,5-triisocyanatobenzene and 2,4,6-triisocyanatotoluene; the adduct of two molecules of a diisocyanate (such as hexamethylene or isophorone diisocyanate) with one molecule of a diol (such as ethylene glycol); the condensate of three molecules of a diisocyanate (such as hexamethylene diisocyanate) with one molecule of water; the adduct of three molecules of a diisocyanate (such as toluene or isophorone diisocyanate) with one molecule of trimethylol propane; the adduct of 4 molecules of a diisocyanate (such as toluene diisocyanate) with one molecule of pentaerythritol; and the isocyanurate trimer of a diisocyanate (such as hexamethylene diisocyanate).

Other isocyanate-containing monomers and oligomers suitable for the crosslinkers according to the invention are in the blocked form obtainable by reaction of isocyanates such as mentioned above with well-known blocking agents. Examples of such well-known blocking agents include ketoximes like methylethyl ketoxime and compounds bearing phenolic OH groups.

As examples of suitable activated unsaturated groups-containing monomers and oligomers may be mentioned (meth)acrylic esters of polyols such as ethylene glycol, propylene glycol, diethylene glycol, butylene diol, neopentyl glycol, hexylene diol, cyclohexane diol, bis(4-hydroxycyclohexyl)methane, glycerol, trimethylol ethane, trimethylol propane, pentaerythritol, polyester polyols and polyacrylic polyols; adducts of a hydroxyl group-containing (meth)acrylic ester to an at least difunctional isocyanate or epoxy compound; unsaturated polyesters built up in part from one or more of maleic acid and anhydride, fumaric acid, itaconic acid and anhydride, or crotonic acid and anhydride; acrylic and methacrylic amide functional compounds such as N,N-methylene bisacrylic amide and the condensation product of 4 moles of acrylic amide with 1 mole of terephthaldialdehyde; reaction products of at least difunctional epoxides with (meth)acrylic acid; and acrylated melamine resins.

As examples of suitable activated methylene groups-containing monomers and oligomers may be mentioned the reaction products of diketene or an alkyl acetoacetate with a polyol having two or more hydroxyl groups, for example, monomeric polyols such as mentioned above as well as polyester polyols such as polycaprolactone polyols, epoxy resins obtained by reacting epichlorohydrin with a dihydroaryl alkane which have been reacted with carboxylic acids, and acrylic polyols obtained by the addition polymerisation of hydroxyl group-containing (meth)acrylic monomers, optionally with other addition polymerizable monomers; and oligomers obtained by (co)polymerising monomer units having one or more acetoacetate groups, for example, the acetoacetate esters of hydroxyalkyl (meth)acrylates or allyl alcohol monomer units.

As an example of suitable cyclic carbonate groups-containing monomers and oligomers may be mentioned those produced by reacting hydroxyl-functional cyclocarbonates, for example glycerol carbonate (commercially available from Huntsman Corporation, Zaventem, Belgium), with a polyisocyanate, and those produced by the addition of $CO_2$ to an epoxy groups-containing monomer or oligomer such as those mentioned above via any one of a number of well-known procedures, such as, for non-limiting example, those disclosed in U.S. Pat. No. 3,535,342, U.S. Pat. No. 4,835,289, U.S. Pat. No. 4,892,954, GB-A-1,485,925 and EP-A-0 119 840.

Monomers and oligomers containing mixtures of the above functionalities may also be utilised, for non-limiting example, glycidyl (meth)acrylate; addition oligomers built up at least in part from glycidyl group-containing monomers in which a portion of the glycidyl groups has been reacted with, for example, acrylic acid, or in which a portion of the glycidyl groups has been converted to cyclic carbonate groups as mentioned above.

Further details on these and other suitable compounds containing at least two amine-reactive groups are well-known in the art, as exemplified by the previously noted references.

Referring now to method (II), as examples of suitable activated unsaturated groups-containing monomers and oligomers providing Michael acceptor moieties may be mentioned (meth)acrylic esters of polyols such as ethylene glycol, propylene glycol, diethylene glycol, butylene diol, neopentyl glycol, hexylene diol, cyclohexane diol, bis(4-hydroxycyclohexyl)methane, glycerol, trimethylol ethane, trimethylol propane, pentaerythritol, polyester polyols, and polyacrylic polyols; adducts of a hydroxyl group-containing (meth)acrylic ester to an at least difunctional isocyanate or epoxy compound; unsaturated polyesters built up in part from one or more of maleic acid and anhydride, fumaric acid, itaconic acid and anhydride, or crotonic acid and anhydride; acrylic and methacrylic amide-functional compounds such as N,N-methylene bisacrylic amide, and the condensation product of 4 moles of acrylic amide and 1 mole of terephthaldialdehyde; reaction products of at least difunctional epoxides with (meth)acrylic acid; and acrylated melamine resins.

As suitable compounds containing at least two amine-reactive groups for use in method (III) may be mentioned the same compounds as mentioned for method (I), with the proviso that if the nucleophilic moiety is a hydroxyl group, only the mentioned isocyanates are suitable.

If desired, for example to achieve a certain hydrophilic/lipophilic balance in the crosslinker according to the invention, a portion of the amine-reactive functional groups of the backbone may be reacted beforehand, concurrently and/or subsequently with a monoamine, especially a fatty amine.

The following three types of cyclic ketimine crosslinkers according to the invention are preferred.

1. Diazepine-functional Crosslinkers

The general formula of these diazepine-functional crosslinkers is:

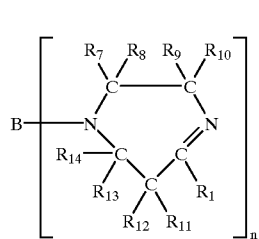

(IV)

wherein $R_7$ through $R_{14}$ are, independently, hydrogen or a substituted or unsubstituted hydrocarbon group, such as a $C_{1-4}$ alkyl group, preferably methyl or ethyl, B, n, and $R_1$ are as defined above. B is preferably provided by a polyepoxy or polyisocyanate monomer or oligomer as described above which has been reacted with diazepine to produce a product according to formula (IV).

A preferred diazepine-functional crosslinker is formula (IV) wherein $R_7$, $R_8$, $R_9$, $R_{11}$, and $R_{12}$ are hydrogen, $R_{10}$ is methyl or ethyl, $R_1$, $R_{13}$, and $R_{14}$ are methyl, n is 2, B is a monomeric or oligomeric backbone, preferably supplied by an epoxy-functional or an isocyanate-functional monomer or oligomer, the functionalities having been reacted with diazepine. Particularly preferred epoxy-functional monomers or oligomers are, for non-limiting example, butane diol diglycidyl ether, Epikote® 828 (available from Shell Chemicals), and 2,2'-(bis-4-hydroxycyclohexyl)-propane diglycidyl ether. The reaction between the diazepine and the epoxy-functional oligomer is carried out at 80–100° C. using n-butanol as catalyst/solvent (6%, based on weight). The reaction between a diazepine and a polyisocyanate is carried out at 0–10° C.

As mentioned above, monocyclic ketimines are known from, e.g., U.S. Pat. No. 3,625,958 and U.S. Pat. No. 3,657,192. The mono-diazepines according to the present invention can also be synthesised by the procedure described by Kasprzyk and Kolinski (S. P. Kasprzyk, R. A. Kolinski, Polish Journal of Chemistry 58 (1984), 721).

In principle, a mono-diazepine can be reacted with all types of amino-reactive backbones for multi-functionalization. As mentioned, preferred are epoxide-functional backbones, especially di-functional epoxides.

Diazepine-functional crosslinkers suitable for waterborne systems can be prepared by the incorporation of polyethylene oxide. This can be achieved by reacting a mono-diazepine and an ethoxylated amine with an amino-reactive backbone. The preferred amino-reactive backbone is a di-epoxide. Ethoxylated amines are commercially available (Jeffamines® ex Huntsman Corporation, Zaventem, Belgium). Preferred as ethoxylated amine is Jeffamine® M1000 reacted with Cardura® E10 (mono-epoxy ex Shell Chemicals or Shell Resins). The amount of ethylene oxide is 1–50%, preferably 5–15%. Compositions comprising these types of crosslinkers may have a high solids content (>80%), preferably >90%. However, these diazepine-functional crosslinkers are not stable in water; they hydrolyse after a few weeks of storage. Accordingly, the ethoxylated versions have to be stirred into the aqueous dispersion/emulsion comprising the amino-reactive binder just before application.

2. 1-Aza-1-cycloheptene-functional crosslinkers p This second type of internally blocked amine has one of the two following general structures:

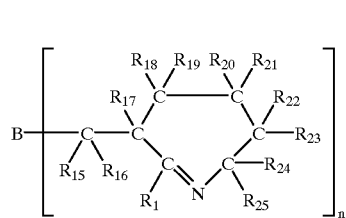

(V)

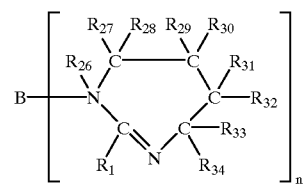

(VI)

wherein $R_{15}$ through $R_{34}$ are, independently, hydrogen or a substituted or unsubstituted hydrocarbon group, such as a $C_{1-4}$ alkyl group, preferably methyl or ethyl, and B is a monomeric or oligomeric backbone, provided by an acryloyl-functional monomer or oligomer. $R_1$ and n are as defined above.

The crosslinker is the reaction product of a (substituted)-1-aza-1-cycloheptene with an acryloyl-functional oligomer. It has been found that under moisture-free reaction conditions 1-aza-2-butyl-1-cycloheptene reacts selectively in a 1 to 1 fashion with an acryloyl functionality.

1-aza-2-alkyl-1-cycloheptenes are known compounds. 1-aza-2-butyl-1-cycloheptene can be synthesised according to the procedure described by Hua et al. in J. Org. Chem. 55 (1990), 3682.

The acrylic ester-containing oligomers are the preferred backbones.

3. Amido-cyclic ketimine-functional crosslinkers

The mono-amido-cyclic ketimines suitable for this invention can be described by the following general formula:

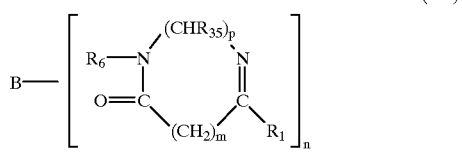

(VII)

wherein B is a monomeric or oligomeric backbone supplied by a polyepoxy- or polyisocyanate-containing compound which has been reacted with mono-amide-cyclic ketimines having a nucleophilic moiety pendant from the ring. $R_6$, $R_1$, and n are as defined above, and $R_{35}$ represents hydrogen, a derivative of a nucleophilic moiety or a substituted or unsubstituted hydrocarbon. Either $R_6$ or $R_{35}$ is attached to B by reacting a electrophilic moiety of B to a nucleophilic moiety being either $R_{35}$ or which is present on either $R_6$ or $R_{35}$ This nucleophilic moiety is, e.g., a hydroxy or amino group. m and p range from 0 to 4, preferably 1 to 4, while n is at least 2.

These types of mono-amide-cyclic ketimines are generally known. They can be prepared from keto-esters or keto-acids and diamines. The following publications disclose the synthesis of amido-cyclic ketimines: (a) W. Ried, W. Höhne, Chem. Ber. 87 (1954), 1811; (b) C. M. Hofmann, S. R. Safir, J. Org. Chem. 27 (1962), 3565; and (c) U.S. Pat. No. 3,293,243.

Rings of different sizes (6–12 membered, that is, 6–12 atoms in the ring) can be prepared. Synthesis of 8- and 9-membered rings proceeds most selectively; high yields of amido-cyclic ketimines were obtained in those cases. Therefore, preference is given to 8- and 9-membered mono-amido-cyclic ketimines for the synthesis of crosslinkers according to the invention.

Further, for the preparation of mono-amido-cyclic ketimine, keto-esters are preferred. Non-limiting examples of suitable keto-esters are: ethyl pyruvate, ethyl-2-ethyl acetoacetate, ethyl acetoacetate, ethyl levulinate, ethyl-4-acetobutyrate, and diethyl-3-oxo glutarate.

The keto-esters were reacted with diamines to form the mono-amido-cyclic ketimine. These diamines preferably contain an additional functionality, preferably having nucleophilic properties, such as a hydroxyl or amino group, which can be used for crosslinker preparation (the so-called multi-functionalization step). Such diamines containing an additional nucleophilic group that have been used are: 1,3-diamino-2-propanol; N-(2-hydroxyethyl)-1,2-diaminoethane; N-(2-hydroxyethyl)-1,3-diaminopropane; N-(2-aminoethyl)-1,3-diaminopropane; diethylene triamine; and dipropylene triamine.

The mono-amido-cyclic ketimines containing a nucleophilic group can be reacted with backbones containing two or more nucleophilic-reactive groups. Non-limiting examples of such nucleophilic-reactive groups are epoxy, isocyanate, acrylate, carbonate, maleate, fumarate, etc. Preferred reagents are the mentioned di- and polyisocyanates.

The coating compositions based upon polyamine crosslinkers and compounds containing amine-reactive functionality ("binders") according to invention can also contain other well-known and usual additives such as pigments, fillers, levelling agents, foam suppressing agents, rheology control agents, catalysts, anti-oxidants, UV-stabilisers, minor amounts of co-solvents as required, etc.

Such coating compositions can be formulated for application by any known manner and onto any type of substrate. Potential end uses for such coatings include but are not limited to: primers, pigmented topcoats and clearcoats for car refinishing; parquet lacquers; primers and topcoats for steel protection; wood coatings; and coatings for plastic substrates.

The foregoing general discussion of the present invention will be exemplified by the following non-limiting examples.

EXAMPLES

1. Preparation of a Diazepine-functional Crosslinker for Solvent Borne (Organic) Systems The following reaction was carried out in a nitrogen atmosphere. A solution of Grilonit® RV 1806 (butane diol diglycidyl ether, 214.1 grams, 1.6 moles of epoxy-groups) and n-butanol (29.3 grams) was added to 3-ethyl-5,7,7-trimethyl-2,3,6,7-tetrahydro-1H-1,4-diazepine (275.0 grams, 1.6 moles, the reaction product of 1,2-diaminobutane and mesityl oxide) over a period of 2 hours at 100° C. The mixture was stirred for an additional 7 hours at 100° C. The resulting product had a viscosity of 800 mPa.s (20.0° C.) and a solids content of 94.3% and is used as such. The amount of free 3-ethyl-5,7,7-trimethyl-2,3,6,7-tetrahydro-1H-1,4-diazepine was 5.3%, which means that the conversion of mono-diazepine to multifunctional diazepine is 90%. Equivalent weight is 318 grams on solution.

2. Preparation of a Diazepine-functional Crosslinker for Water Borne Systems

The following reaction was carried out in a nitrogen atmosphere. A solution of butane diol diglycidyl ether (purity of 95%, 81 grams, 400 mmoles) in n-butanol (13.5 grams) was added to a mixture of 3,5,7,7-tetramethyl-2,3,6,7-tetrahydro-1H-1,4-diazepine (PDA-diazepine, 125 grams, 810 mmoles, the reaction product of 1,2-diaminopropane and mesityl oxide) and "JCEA" (18 grams, equivalent weight=1250, 14.4 mmoles amine, the reaction product of 1 mole Jeffamine® M1000 (Huntsman) and 1 mole of Cardura® E10 (Shell)) over a period of approximately 2 hours at 100° C. The reaction mixture was stirred for an additional 20 hours at 100° C. The reaction was monitored for the amount of free PDA-diazepine by GLC analysis. The resulting crosslinker possessed the following characteristics: solids content: 94.3%; viscosity: 367 mPa.s; % free PDA-diazepine: 4.7% on solids; % polyethylene oxide: 5.5% on solids; equivalent weight: 293 grams on solution.

3. Preparation of an 1-aza-1-heptene Functional Crosslinker for Solvent Borne Systems The following reaction was carried out in a nitrogen atmosphere. A mixture of 2-butyl-1-azacycloheptene (77.7 grams, 0.51 mole) and an acryloyl-functional oligomer (276.9 grams, 0.51 mole activated double bonds) was heated to 60° C. and stirred for 2 hours. The functional oligomer is the reaction product of Vestanat® T 1890 (a polyisocyanate ex Huls) and 2-hydroxypropyl acrylate in butylacetate (solids content 69.5%). Gas chromatography analysis indicated that the conversion of 2-butyl-1-azacycloheptene was >95%. IR-spectroscopy indicated that all acryloyl groups had disappeared. The resulting crosslinker had a viscosity of 100 mPa.s (20.0° C.) and was used as such.

4. Examples of Crosslinkers Based on Amido-cyclic Ketimines a. 9-Membered Ring, Hydroxy-functional 1,3-diamino-2-propanol (13.52 grams, 150 mmoles) was heated to 40° C. Ethyl levulinate (21.63 grams, 150 mmoles) was added over a period of one hour; the temperature increased to 60° C. The condensation products were removed by stripping with n-heptane using a rotation evaporator at 80° C. and reduced pressure. The crude product was identified by GCMS analysis as mono-cyclic-amido ketimine (9-membered ring). Cythane® 2601 (available from American Cyanamid, having 165 equivalents of NCO) was added to the crude mono-cyclic-amido ketimine (9-membered ring) over a period of one hour. The addition was started at room temperature. An exothermic reaction occurred, resulting in a temperature rise to 35° C. The mixture was stirred for an additional 3 hours at 60° C. and for 3 hours at 80° C. The conversion of isocyanate was checked by IR spectroscopy. When the addition was complete, 1-methoxy-2-propanol was added until a solids content of 44% was reached. Analysis of the product by HPSEC indicated that the addition of the mono-amido-cyclic ketimine was selective to the polyisocyanate.

b. 8-Membered Ring, Hydroxy-functional

The same procedure was followed as described in Example 4a, using N-(2-hydroxyethyl)-1,2-diaminoethane and ethyl levulinate. For the addition of the mono-amido-cyclic ketimine to Cythane® 2601 a catalytic amount of dibutyl tin dilaurate was used. The sample had a solids content of 50% in a mixture of butyl acetate and 1-methoxy-2-propanol.

c. 9-Membered Ring, Amino-functional

The same procedure was followed as described in Example 4a, using N-(2-aminoethyl)-1,3-diaminopropane and ethyl levulinate. The mono-amido-cyclic ketimine reacted with Desmodur® VP LS2032 (available from Bayer, Leverkusen, Germany). The Desmodur® VP LS2032 was dosed at room temperature and reacted for 2 hours at 60° C.), yielding a crosslinker with a solids content of 75% in a mixture of butyl glycol and water (ratio 1:5). This crosslinker is suitable for water borne coating systems.

5. Coating Composition

A binder composition was prepared from 55,5 wt % styrene, 23.1 wt % glycidyl methacrylate, and 21,4 wt % lauryl methacrylate. The epoxy groups of glycidyl methacrylate were esterified with acrylic acid in the resulting binder. The binder composition had the following characteristics: solids content: 62% in Solvess 100, ex Exxon, as solvent; equivalent weight: 1312 grams on solution; viscosity: 4135 mPa.s.

A coating composition was prepared from 25 parts by weight of the above-mentioned binder composition, 3,6 parts by weight of the diazepine-functional crosslinker prepared in example 1, and 3,0 parts by weight of butylacetate. The equivalent ratio of diazepine to C=C was 0,6. The coating composition was applied to a steel panel and cured at room temperature. Below are listed the properties of the coating film after 1 day and after 3 weeks:

|  | 1 day | 3 weeks |  |
|---|---|---|---|
| Persoz hardness: | 34 | 207 |  |
| Water resistance: | 4 | 5 | (exposed to water for one hour) |
| Petrol resistance: | 2 | 5 | (exposed to petrol for one minute) |
| MEK resistance: | 1 | 2 | (exposed to methyl ethyl ketone for one minute) |

For the resistance test results, 0 means that the coating composition was totally dissolved, and 5 means that the coating composition was not damaged at all.

We claim:

1. An internally blocked polyamine crosslinker a cyclic ketimine or aldimine of the following formula

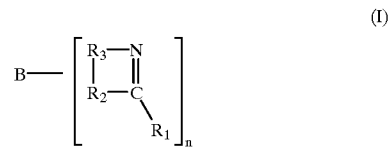

wherein

B is a monomeric or oligomeric backbone;

$R_1$ is hydrogen or a substituted or unsubstituted hydrocarbon group, optionally containing a functional group;

at least one of $R_2$ and $R_3$ is a substituted or unsubstituted alkylene group;

at most one of $R_2$ or $R_3$ is a group of the formula (II) or (III)

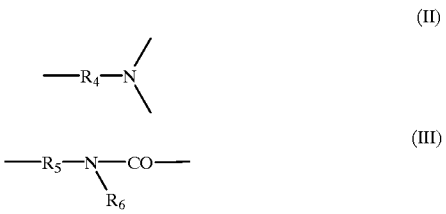

wherein $R_4$ is a substituted or unsubstituted alkylene group, and the N atom is attached to both B and the other of $R_2$ or $R_3$, $R_5$ is a substituted or unsubstituted alkylene group and $R_6$ is hydrogen or a substituted or unsubstituted alkyl group, while either $R_5$ or $R_6$ is attached to B;

$n \geq 2$; and the ring defined by $R_3$, $R_2$, and N=C in formula (I) consists of 4–12 atoms.

2. A coating composition comprising the crosslinker according to claim 1 and a binder containing amine reactive functionalities.

3. A coating composition according to claim 2 wherein the coating composition is an organic solvent borne system.

4. A coating composition according to claim 2 wherein the coating composition is a waterborne system.

5. A coating composition according to claim 2 wherein the binder is an acryloyl group- and/or acetoacetate group-containing compound.

6. A method of producing an internally blocked polyamine crosslinker according to claim 1, the crosslinker comprising a monomeric or oligomeric backbone having pendant therefrom at least two groups each comprising at least one internally blocked amine, the method comprising reacting 1) a compound comprising at least one internally blocked amino group having a ring, the ring further comprising at least one secondary amino group and 2) a substantially stoichiometric amount of a monomer or oligomer comprising at least two amino-reactive groups.

7. A method of producing an internally blocked polyamine crosslinker according to claim 1, the crosslinker comprising a monomeric or oligomeric backbone having pendant therefrom at least two groups each comprising at least one internally blocked amine, the method comprising reacting, under moisture-free conditions, 1) a compound comprising at least one internally blocked amino group and 2) a substantially stoichiometric amount of a monomer or oligomer comprising at least one Michael acceptor moiety.

8. A method of producing an internally blocked polyamine crosslinker according to claim 1, the crosslinker comprising a monomeric or oligomeric backbone having pendant therefrom at least two groups each comprising at least one internally blocked amine, the method comprising reacting 1) a compound comprising at least one internally blocked amino group having a ring and one nucleophilic moiety pendant from the ring and 2) a substantially stoichiometric amount of a monomer or oligomer comprising at least two nucleophilic-reactive moieties.

9. A coating composition according to claim 3, wherein the binder is an acryloyl group- and/or acetoacetate group-containing compound.

10. A coating composition according to claim 4, wherein the binder is an acryloyl group- and/or acetoacetate group-containing compound.

* * * * *

UNITED STATES PATENT AND TRADEMARK OFFICE
CERTIFICATE OF CORRECTION

PATENT NO. : 6,077,929
DATED : June 20, 2000
INVENTOR(S) : Pardoen, et al.

It is certified that error appears in the above-indentified patent and that said Letters Patent is hereby corrected as shown below:

Claim 1, line 1, a comma (,) should appear after "crosslinker".

Claim 1, line 2, a comma (,) should appear after "aldiminie".

Signed and Sealed this

First Day of May, 2001

Attest:

NICHOLAS P. GODICI

Attesting Officer

Acting Director of the United States Patent and Trademark Office